US006763846B2

(12) United States Patent
Haruch (10) Patent No.: US 6,763,846 B2
(45) Date of Patent: Jul. 20, 2004

(54) FLUID DISTRIBUTION DEVICE

(75) Inventor: David Haruch, Media, PA (US)

(73) Assignee: United States Filter Corporation, Palm Desert, CA (US)

( * ) Notice: Subject to any disclaimer, the term of this patent is extended or adjusted under 35 U.S.C. 154(b) by 24 days.

(21) Appl. No.: 09/933,973

(22) Filed: Aug. 20, 2001

(65) Prior Publication Data

US 2003/0034067 A1 Feb. 20, 2003

(51) Int. Cl.[7] .............................................. G05D 11/03
(52) U.S. Cl. ......................... 137/98; 137/114; 137/907
(58) Field of Search ..................... 137/100, 98, 907, 137/114

(56) References Cited

U.S. PATENT DOCUMENTS

| | | |
|---|---|---|
| 2,384,266 A | 9/1945 | St. Clair |
| 2,547,823 A | 4/1951 | Josephian |
| 2,578,042 A | 12/1951 | Chandler |
| 2,630,821 A | 3/1953 | Arey et al. |
| 2,641,273 A | 6/1953 | Siebens |
| 2,754,659 A | 7/1956 | Dick |
| 2,775,980 A | 1/1957 | Renaudie |
| 3,001,541 A | 9/1961 | St. Clair |
| 3,133,440 A | 5/1964 | Conkling |
| 3,141,331 A | 7/1964 | Wilson |
| 3,154,945 A | 11/1964 | Busillo |
| 3,181,358 A | 5/1965 | Busillo |
| 3,194,254 A * | 7/1965 | Zmek ........................ 137/114 |
| 3,220,430 A | 11/1965 | Haskett |
| 3,342,068 A | 9/1967 | Metzger |
| 3,554,212 A | 1/1971 | Maroney |
| 3,604,445 A * | 9/1971 | Jordan et al. ............... 137/113 |
| 3,646,958 A | 3/1972 | Braas |
| 3,658,081 A * | 4/1972 | Renaudie .................... 137/113 |
| 3,691,835 A | 9/1972 | Metzger |
| 3,779,268 A | 12/1973 | Conkling |
| 3,895,642 A * | 7/1975 | Bird et al. ...................... 137/7 |
| 3,989,186 A | 11/1976 | McMichael |
| 3,997,107 A * | 12/1976 | Block et al. ........... 137/118.06 |
| 4,050,305 A | 9/1977 | Evans et al. |
| 4,099,412 A | 7/1978 | Nehrbass |
| 4,197,809 A | 4/1980 | Johnson |
| 4,202,180 A | 5/1980 | Cox |
| 4,223,557 A | 9/1980 | Brinkman |
| 4,241,749 A | 12/1980 | Petursson |
| 4,245,513 A | 1/1981 | Clements et al. |
| 4,250,144 A | 2/1981 | Ratigan |
| 4,254,789 A * | 3/1981 | Westberg ...................... 137/88 |
| 4,254,790 A | 3/1981 | Eriksson et al. |
| 4,257,279 A | 3/1981 | Marx |
| 4,324,267 A | 4/1982 | Bach |
| 4,333,833 A | 6/1982 | Longley et al. |
| 4,341,234 A | 7/1982 | Meinass et al. |
| 4,489,016 A | 12/1984 | Kriebel |
| 4,655,246 A | 4/1987 | Phlipot et al. |

(List continued on next page.)

FOREIGN PATENT DOCUMENTS

| | | |
|---|---|---|
| CH | 44650 | 4/1908 |
| DE | 868.515 | 12/1940 |
| DE | 2012702 | 10/1970 |
| EP | 0 358 317 A2 | 3/1990 |
| FR | 2206280 | 6/1974 |
| GB | 629159 A | 9/1949 |
| JP | 55-118109 | 9/1980 |
| WO | WO 87/05133 A1 | 8/1987 |
| WO | WO 97/00405 A1 | 1/1997 |

*Primary Examiner*—Stephen M. Hepperle
(74) *Attorney, Agent, or Firm*—Wolf, Greenfield & Sacks, P.C.

(57) ABSTRACT

An apparatus and method for distributing a fluid. A fluid distribution device includes a flow chamber comprising an inlet and an outlet, an equalization chamber; and a diaphragm separating the flow chamber and the equalization chamber, wherein a valve positioned in a flow path between the flow chamber inlet and the flow chamber outlet comprises a valve body coupled to the diaphragm.

19 Claims, 8 Drawing Sheets

U.S. PATENT DOCUMENTS

| | | |
|---|---|---|
| 4,674,526 A | 6/1987 | Athanassiu |
| 4,752,211 A | 6/1988 | Sabin |
| 4,830,743 A | 5/1989 | Koster et al. |
| 4,867,413 A | 9/1989 | Tessler |
| 4,874,116 A | 10/1989 | Fallon et al. |
| 4,923,092 A | 5/1990 | Kirschner et al. |
| 4,944,324 A | 7/1990 | Kajino et al. |
| 4,986,122 A | 1/1991 | Gust |
| 4,993,447 A * | 2/1991 | Camire .................. 137/118.03 |
| 4,993,684 A | 2/1991 | Prina |
| 5,046,701 A | 9/1991 | Barber |
| 5,083,546 A | 1/1992 | Detweiler et al. |
| 5,095,950 A | 3/1992 | Hallberg |
| 5,151,250 A | 9/1992 | Conrad |
| 5,158,748 A | 10/1992 | Obi et al. |
| 5,189,991 A | 3/1993 | Humburg |
| 5,193,400 A | 3/1993 | Lew |
| 5,320,128 A | 6/1994 | Tablert |
| 5,669,419 A | 9/1997 | Haas |
| 5,827,959 A | 10/1998 | Clanin |
| 6,105,598 A | 8/2000 | Cabrera et al. |

* cited by examiner

FLUID DISTRIBUTION DEVICE

BACKGROUND OF THE INVENTION

1. Field of the Invention

The present invention relates to an apparatus for the distribution of a fluid and, more specifically, to an apparatus for providing distribution of a fluid from two or more sources.

2. Description of the Related Art

A number of different methods and techniques are available for the disinfection of water. These methods include, for example, filtration, heating, treatment with UV radiation, and treatment with a variety of chemicals, often oxidizers such as chlorine, chloramine and ozone. One of the most widely used treatments for both potable and waste water is to dissolve chlorine in the water. Chlorine may be in a variety of forms, such as, for example, a gas ($Cl_2$), a liquid (sodium hypochlorite solution) or a solid (calcium hypochlorite). Because it is effective, inexpensive and readily available, chlorine gas, which may be compressed to a liquid, is a widely used oxidant in the water treatment industry.

Chlorine gas is typically manufactured off site and is delivered to a water treatment facility in pressurized containers, such as gas cylinders. At the site, for example, a municipal water treatment facility, the chlorine is introduced into the water in a concentration adequate to provide an acceptable level of disinfection. Often, the gas is introduced into the water via a vacuum injector system or a vacuum induction system that draws the chlorine into the water at a pressure that is below atmospheric pressure. When such a technique is used, chlorine is less apt to escape from the disinfection system because, if a leak forms in the system, the constant draw of the vacuum source will prevent the escape of gas to the atmosphere. However, for efficient storage and transportation, chlorine is generally shipped and stored in pressurized containers, and the pressure of the gas must first be reduced to feed a vacuum injector. Such a system is disclosed, for example, in U.S. Pat. No. 6,105,598, which is hereby incorporated by reference in its entirety herein.

Often, a series of pressurized gas cylinders are drawn from in parallel to provide an adequate supply of gas. Multiple cylinders may be plumbed to a single vacuum regulator, so that the gas is at greater than atmospheric pressure upstream of the regulator and below atmospheric pressure downstream. A vacuum regulator, such as the S10K™ vacuum regulator, available from United States Filter Corporation, Vineland, N.J., may be used to provide a low pressure source of chlorine, or other gases, to a vacuum injector system from a number of gas sources, such as chlorine cylinders or tanks. When a pressurized gas, for example, chlorine gas, is fed to a regulator from multiple tanks, the tanks may be emptied without significant drops in temperature as there is minimal gas expansion upstream of the regulator.

Many users of vacuum injection systems, particularly those disinfecting a water supply, may prefer to use a bank of cylinders where each gas cylinder is independently regulated. In this case, each cylinder may be fitted with a vacuum regulator that is then used to feed a common, low-pressure gas manifold. Such a configuration may reduce the total amount of high pressure gas piping that is required at a facility. However, this configuration may also mean that high pressure gas is being reduced to low pressure gas at numerous locations, such as at the point of exit of each of the gas cylinders. If there are slight differences in regulator design or construction, or if each cylinder is not identically situated, gas may be drawn preferentially from one cylinder rather than equally from all, resulting in unequal gas distribution from containers within a bank or between banks. In this instance, significant gas expansion and/or boiling may occur in a tank being drawn down at an excessive rate, which may result in a variety of problems, including frosting, that may interfere with the function and output from one or more cylinders. This unequal and unpredictable cylinder depletion may result in a failure to maintain a consistent supply of gas to the low pressure system.

SUMMARY OF THE INVENTION

In one aspect, a fluid distribution device is provided, the fluid distribution device comprising a flow chamber comprising an inlet and an outlet, an equalization chamber; and a diaphragm separating the flow chamber and the equalization chamber, wherein a valve positioned in a flow path between the flow chamber inlet and the flow chamber outlet comprises a valve body coupled to the diaphragm.

In another aspect, an equal drawdown device is provided, the equal drawdown device comprising a vacuum gas regulator comprising a valve in fluid communication with a gas source and with a vacuum source, the vacuum source providing a first force in a direction to open the valve, and a second force acting on the valve, wherein the second force is variable and opposed to the vacuum force.

In another aspect, an equal drawdown device is provided, the equal drawdown device comprising a compartment having at least a first and a second outlet and at least a first and second inlet, a first valve comprising a valve body and a valve seat positioned in a fluid pathway between the first inlet and the first outlet, a second valve comprising a valve body and a valve seat, positioned in a fluid pathway between the second inlet and the second outlet, and wherein the valve body of the first valve is coupled to the valve body of the second valve.

In another aspect, an equal drawdown device is provided, the equal drawdown device comprising a vacuum gas regulator comprising a valve in fluid communication with a sub-atmospheric disinfectant source and with a vacuum injection system, the vacuum injection system providing a force tending to open the valve, and means for controllably opposing the force provided by the vacuum injection system.

BRIEF DESCRIPTION OF THE DRAWINGS

Preferred, non-limiting embodiments of the present invention will be described by way of example with reference to the accompanying drawings, in which.

DETAILED DESCRIPTION

The invention provides for an apparatus to equalize the drawdown (mass flow) between two or more fluid sources feeding one or more outlets. The apparatus provides a system that detects differences in rates of drawdown among fluid sources, for example, gas cylinders, and adjusts the output of one or more sources accordingly. The apparatus may provide, for example, mechanical or electrical feedback mechanisms that constantly or intermittently adjust the rates of flow from each of a plurality of sources. The apparatus may be used with existing fluid distribution systems and may be particularly useful with gas disinfection systems, such as those that use chlorine gas to disinfect municipal water supplies. Furthermore, the apparatus may be used to equalize flow within a bank of cylinders and also between banks of cylinders. Thus, a set of cylinders in a particular bank may be emptied, and thus replaced at approximately the same time.

In one aspect, an equal drawdown device is provided that has two inputs, one for each of two different low pressure gas sources such as, for example, chlorine, ammonia or sulfur dioxide. For example, two chlorine gas cylinders, each equipped with a vacuum regulator may feed the device simultaneously. The device may have two separate outlets, feeding one or more low pressure systems, such as a vacuum injection system or a chemical induction system such as the WATER CHAMP® chemical induction system (U.S. Filter Stranco Products, Bradley, Ill.).

Figure 1:
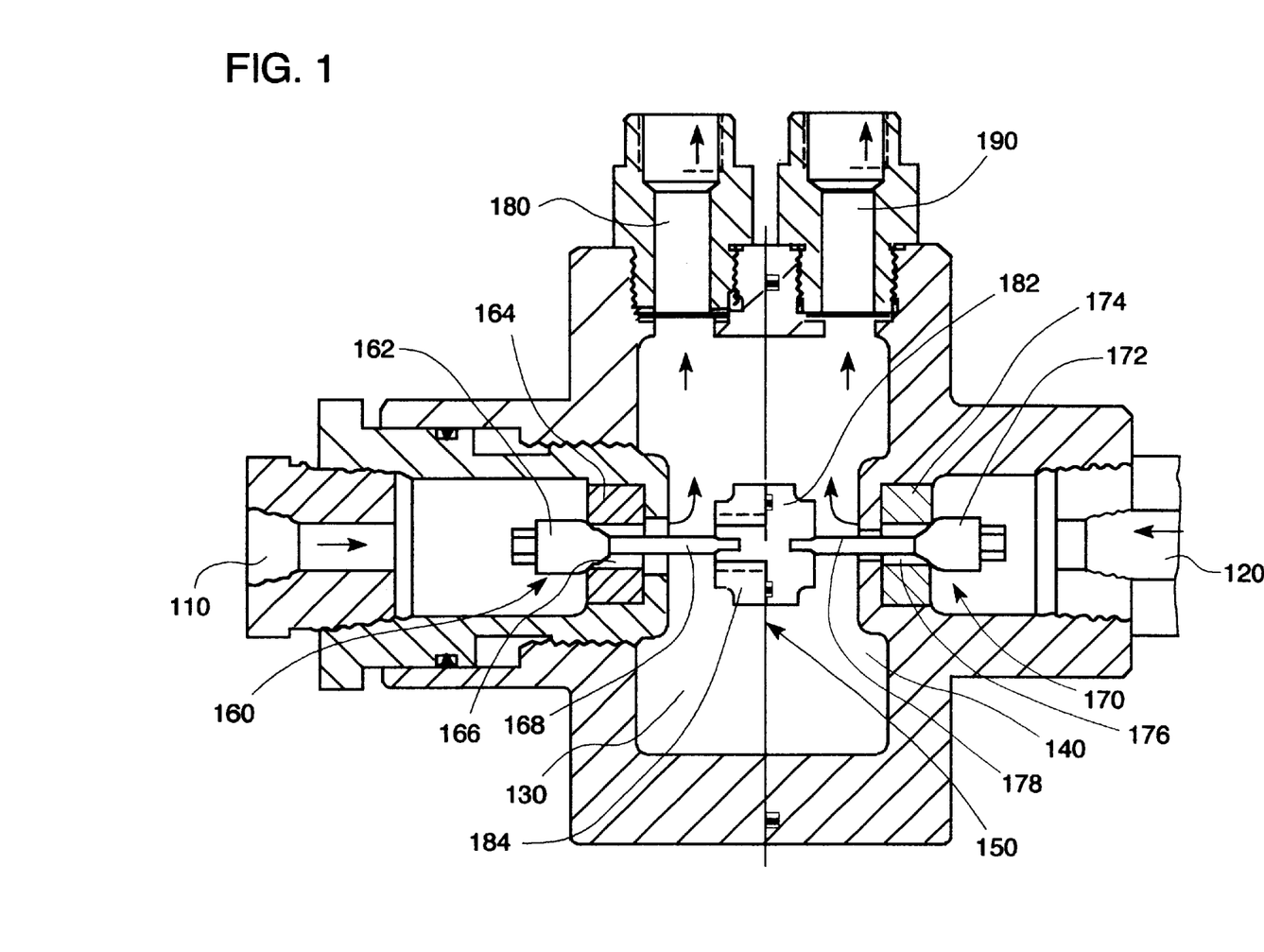
FIG. 1 is a schematic cross-sectional illustration of an equal drawdown device having two inlets and two outlets.

An embodiment of an equal drawdown device is shown in FIG. 1. FIG. 1 provides a schematic cross-sectional view of an equal drawdown device 100 having a first inlet 110, a second inlet 120, and a compartment divided into a first low pressure chamber 130 and a second low pressure chamber 140 by flexible diaphragm 150. The flow of gas between inlet 110 and low pressure chamber 130 is controlled by the positioning of valve body 162 in relation to valve seat 164. Likewise, the flow of gas from inlet 120 into low pressure chamber 140 may be controlled by the positioning of valve body 172 in relation to valve seat 174. Outlets 180 and 190 each lead to the same low pressure source, such as a vacuum injector or vacuum inductor (not shown) and provide for the flow of gas from chambers 130 and 140, respectively. Thus, gas may flow through inlet 110, through orifice 166 into chamber 130 and out of the equal drawdown device through outlet 180. Likewise, gas may flow through inlet 120 through orifice 176 into chamber 140 and out of the equal drawdown device through outlet 190.

Valve spool 182 provides a common connection between valve bodies 162 and 172 via valve pins 168 and 178. Valve spool 182 is clamped onto diaphragm 150 by nut 184 such that when diaphragm 150 is deflected, valve bodies 162 and 172 are both shifted in the direction of the deflection. Thus, if the pressure in chamber 140 increases in relation to the pressure in chamber 130, diaphragm 150 will deflect from right to left, moving the valve pins and valve bodies in the same direction. Therefore, if the diaphragm is deflected from right to left, valve 160 is opened and valve 170 is closed, thus increasing the flow through inlet 110 and decreasing the flow through inlet 120. Because the valve bodies are connected, the distance between each valve body and its corresponding valve seat changes inversely to a change in distance between the opposing valve body and its corresponding valve seat. This configuration may result in a self regulating system as outlets 180 and 190 are subjected to substantially the same vacuum pressure when they are plumbed to a common vacuum source. Thus if equal gas flows enter chambers 130 and 140, diaphragm 150 will remain stable and the flow through each of the respective inlets will remain approximately the same. Should the flow from one side, however, vary, for instance if the flow through inlet 110 increases, the relative pressure in chamber 130 will be greater than that in chamber 140 and the diaphragm will deflect to the right. This deflection will, in turn, move both valve bodies 162 and 172 to the right, throttling the flow through orifice 166 and increasing the flow through orifice 176. Diaphragm 150 will stabilize in a new position once the gas flow through each of the inlets, and therefore the pressure in each of chambers 130 and 140, is substantially equal.

By using common geometries for valves 160 and 170, and by mutually opposing the two valve assemblies, any drag force effects on each of the valves may be cancelled due to the common connection. Therefore, while compensating for drag force might play an important role in adjusting and maintaining a specific flow through a single valve, the common connection between the two valve bodies illustrated in FIG. 1 provides for accurate flows without regard to the actual drag force on the mutually opposed valve bodies. This can provide for a simpler design and a simplification, or even elimination, of a control system. It is preferred that the valve bodies be conically shaped, and that the valve bodies be spaced apart, so that regardless of the positioning of diaphragm 150, the total gas flow through inlets 110 and 120 is adequate to supply the amount of fluid called for by the vacuum source. The distance between the valve bodies may be adjustable to allow for different flow rates through the system.

Materials of construction are preferably chosen to be compatible with the fluid that is being distributed and with the environment in which the device is used. For example, the parts of the equal drawdown device that come into contact with the gas being distributed may be of corrosion resistant material such as alloyed steel or polymeric material. Preferably, fluid wettable parts, such as the inlet, the valving, the compartment and the outlets are of corrosion resistant alloys such as HASTELLOY® (Haynes International, Indiana).

It is preferred that diaphragm 150 be constructed of material that is flexible enough to allow deflection of the valve's spool and resistant enough to withstand exposure to harsh environments such as those provided by chlorine, ammonia or sulfur dioxide gas. For example, if the device is to be used to distribute chlorine or sulfur dioxide, it may be preferred that the diaphragm material be of synthetic rubber, such as VITON® elastomer, available from E. I. Du Pont (Delaware). If a gas such as ammonia is to be distributed, it may be preferred that the diaphragm be of a corrosion resistant elastomeric material such as a chlorinated polyethylene, for example, HYPALON® elastomer available from E. I. Du Pont (Delaware).

Figure 2:
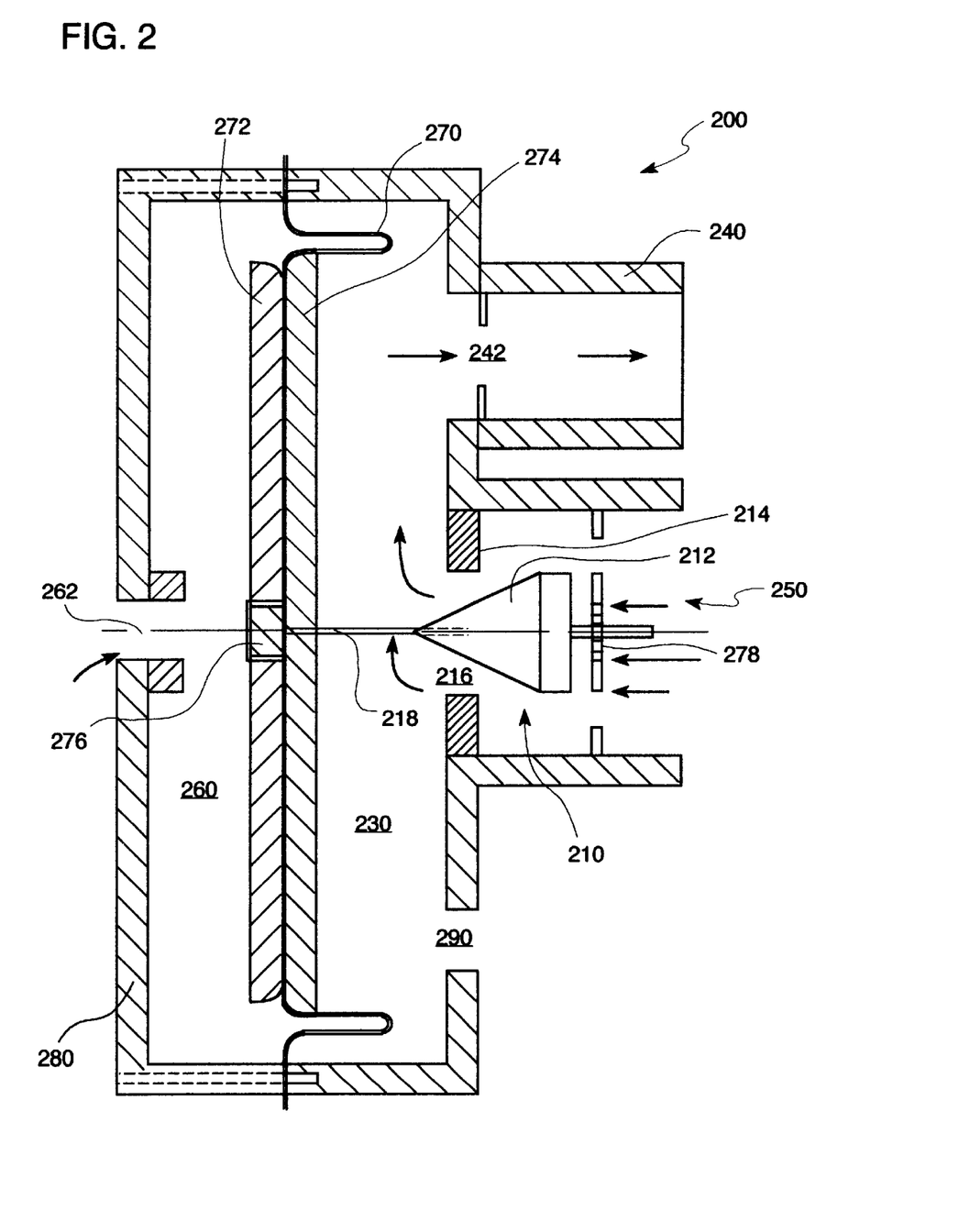
FIG. 2 is a schematic cross-sectional illustration of an equal drawdown device having a single inlet and a single outlet.
Figure 3:
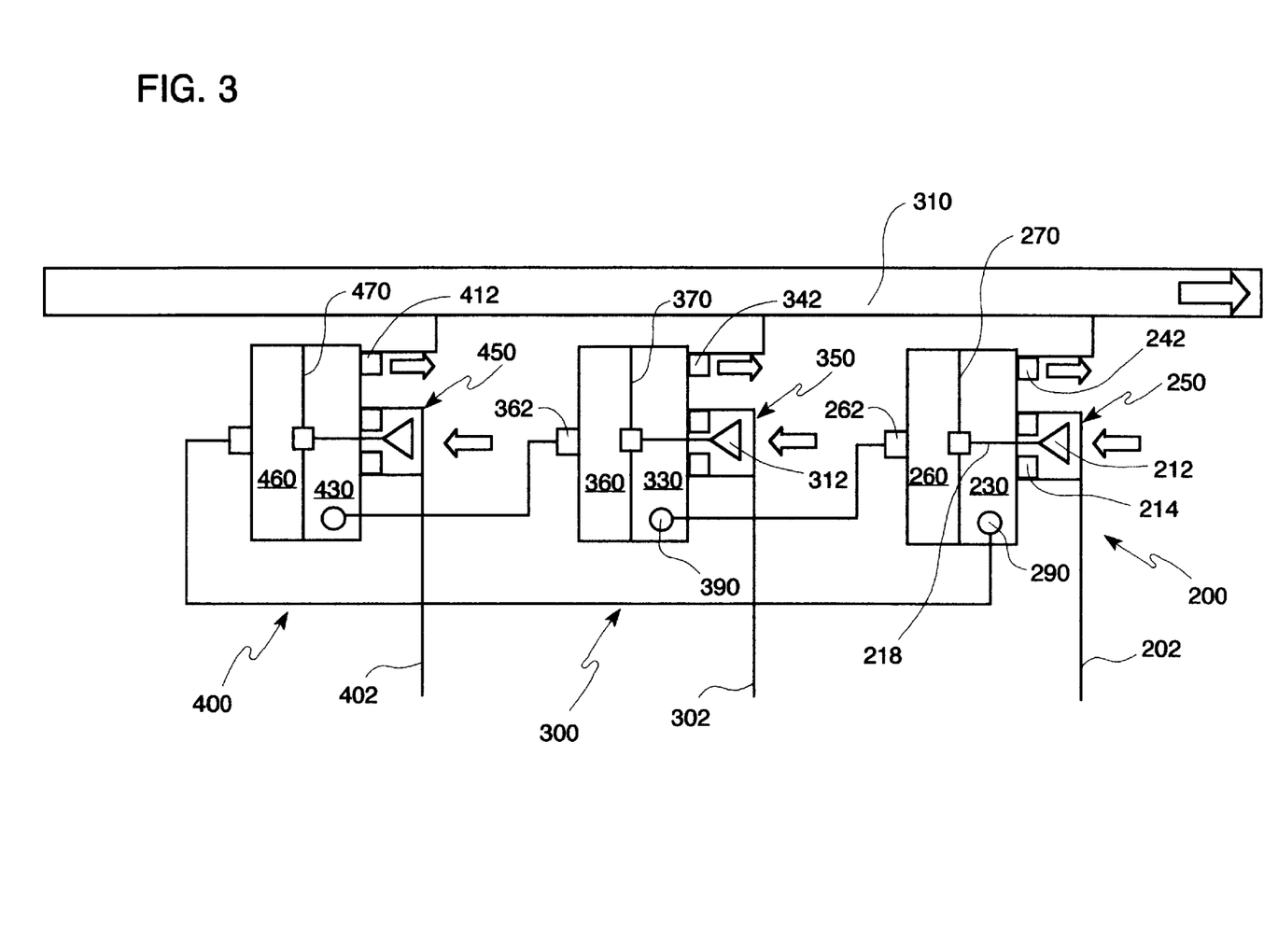
FIG. 3 is a schematic illustration of a system using three of the devices shown in FIG. 2.

In another aspect, the invention provides for a fluid distribution device in which the flow of fluid through a single inlet to a vacuum source is independently controlled. Multiple devices can be joined together so that the flow of fluid through any one of the devices can be equalized in relation to the flow through the joined devices. One embodiment of such a device is depicted schematically in FIGS. 2 and 3. Fluid distribution device 200 includes a housing 280 which may include an inlet 250, an outlet 242 and an equalization orifice 290. Device 200 also includes rolling diaphragm 270 that is held between two diaphragm plates 272 and 274. Rolling diaphragm 270 is connected to valve body 212 by valve pin 218 which helps to support the valve body in combination with bearing 278. Bearing 278 may also slidably align and center valve body 212 in reference to orifice 216. When valve body 212 is moved to the right (as shown in FIGS. 2 and 3), orifice 216 is opened as the distance between valve body 212 and valve seat 214 increases. Thus, if a source of low pressure, for example, a vacuum source, is connected to outlet 242 and a higher pressure gas source is connected to valve 250, the gas will flow from inlet 250 through orifice 216 into chamber 230 and through outlet 242 to the low pressure source. Equalization orifice 290 may provide fluid communication between chamber 230 and another equalization chamber, such as an additional equalization chamber in a similar device. Equalization chamber 260 may be connected, for example, with the flow chamber of a similar or identical device, through orifice 262 (in the other device). Alternatively, connection 262 may communicate with the surrounding atmosphere to assure that equalization chamber 260 is at ambient pressure, or 262 may be sealed to provide a substantially constant absolute pressure in equalization chamber 260.

When vacuum is applied to outlet 242, the pressure in chamber 230 may be below atmospheric and may be a function of the amount of gas flow through valve 250 into the chamber. Thus, if fluid flow into chamber 230 increases for any reason, for example, a change in upstream pressure, the pressure in chamber 230 will increase in relation to the pressure in chamber 260 and rolling diaphragm 270 will move from right to left (as oriented in FIG. 2). This movement will also move pin 218 from right to left, drawing valve body 212 from right to left as well. This will serve to decrease the size of orifice 216, thus reducing the flow of fluid from the fluid source through valve 250. Thus, the flow through flow chamber 230 may be self-regulating due to the dynamic movement of rolling diaphragm 270. This may provide for a substantially consistent flow rate without the need for external control, thus providing an inexpensive and easily serviceable fluid distribution device. If preferred, the pressure in equalization chamber 260 may be varied as a method of adjusting the flow through chamber 230.

In a further embodiment, such as that shown in FIG. 3, one or more of the fluid distribution devices shown in FIG. 2 may be joined together to provide interactive regulation of fluid flow from two or more fluid sources. FIG. 3 illustrates a series of three of the devices shown in FIG. 2, devices 200, 300 and 400. Each of these devices may be identical. Device 200 regulates a flow of gas from inlet 202 to outlet 242 that is connected to vacuum manifold 310, which may in turn lead to a vacuum source such as a vacuum injection system (not shown). Likewise, device 300 distributes a gas from source 302 to outlet 342 which in turn feeds common manifold 310. Device 400 may be configured similarly. A series of three devices as shown, may represent, for example, the feed from three individual sources such as cylinders forming a bank of cylinders or, alternatively, the distribution of fluid from three groups, such as different banks of cylinders. The flow chamber of each of the devices may be in communication with one or more of the equalization chambers of another device. For example, flow chamber 230 may be plumbed to fluidly communicate with equalization chamber 460, and thus these chambers, 230 and 460, may be maintained at substantially equal pressures. Likewise, flow chamber 430 and equalization chamber 360 may be at substantially equal pressures, and flow chamber 330 and equalization chamber 260 may also be at substantially equal pressures.

As the flow through each of valves 250, 350 and 450 may be influenced by changes in the flow rate and/or pressure in any one or more of the devices, each of the devices may adjust the flow from its fluid source in response to a change in the flow of any one or more of the other fluid sources. As the vacuum pressure at manifold 310 is in communication with each of the flow chambers, an approximately equal vacuum force may be applied to each of the flow chambers. One example of how the flow through each of the devices may be regulated is as follows.

If a flow through valve 250 increases due to external factors such as, for example, an adjustment in an upstream vacuum regulator, the pressure in chamber 230 will increase, resulting in a concurrent increase in pressure in equalization chamber 460 of device 400. When the pressure in chamber 460 increases in relation to the pressure in adjacent flow chamber 430, rolling diaphragm 470 may slide from left to right (oriented as shown in FIG. 3) resulting in an opening of valve 450 and an increase in flow of fluid from source 402 to outlet 442. This increase in flow through chamber 430 will result in an increase in pressure in the chamber and this increase in pressure will also be realized in equalization chamber 360 of device 300 which is in fluid communication with chamber 430 via connector 362. This increase in pressure in equalization chamber 360 may result in a shift of rolling diaphragm 370 from left to right resulting in an opening of valve 350 and an increase in the flow of fluid from source 302 to outlet 342. Conversely, an opposite series of shifts may occur if there is a decrease in the pressure (decrease in flow) in one of the flow chambers.

Therefore, because of the communication between the three devices shown in FIG. 3, a change in the flow through one of them, for example device 200, may lead to a similar change in flow in each of the other devices, 300 and 400. This change in flow may be triggered by an increase in demand at manifold 310, for example, or by a change in supply at one of the three gas sources 202, 302 or 402. It is preferable that whatever change occurs in the flow through one of the devices also occurs in the connected devices as well. This may help to draw down gas supplies equally from each of multiple sources, helping to eliminate preferential depletion of one source over another. In turn, this may help in reducing frosting and its related deleterious effects, and may also allow for the changing out of empty cylinders within a bank at substantially the same time. Any number of devices may be included in a system and any number of systems may be used in parallel or in series to combine the flows of multiple groups of fluid sources.

The materials with which each of the devices may be constructed include any material that is suitable for the environment in which the fluid distribution device is to be used. For example, the valves, housings and piping may be made out of alloys such as stainless steel or, alternatively, a polymeric material, such as polyamide. Preferably, the material can withstand any corrosive effects of the fluid being distributed and is resistant to temperatures that may be encountered when the device is used on site. Most preferably the housing is constructed of PVC polymer and the valve components are of PTFE.

Rolling diaphragm 270 may be substituted by any component capable of adjusting the position of the valve in response to a change in pressure differential between the flow chamber and the equalization chamber. For example, a rolling diaphragm, a bellows-type diaphragm or a stationary flexible flat diaphragm may be used. Alternatively, a pressure transducer in one or in each of the two chambers may be employed, and the difference detected between the two pressures may be used to adjust the positioning of valve body 212. Thus, the interactive adjustment between devices may be, for example, mechanical, electrical, hydraulic or pneumatic. Preferably, a diaphragm, and most preferably a rolling diaphragm is used, because it provides low resistance to a change in pressure differential as well as providing a relatively extensive length of travel.

By allowing for an extensive length of travel, the positioning of valve body 212 in relation to valve seat 214 may be adjusted in response to small pressure changes without causing excessive increases or decreases in the rate of flow through the valve. This may help avoid upsets or cascade effects that can result from under or over adjustment. Preferably, the length of travel is more than one inch, and more preferably, is greater than or equal to three inches. For example, if a three inch length of travel is required between a completely closed and completely open position of valve 250, a change in pressure that results in movement of a fraction of an inch will result in only a slight change in the flow through valve 250, possibly reducing the chance of an upset that might occur should the flow of fluid through the valve be over-adjusted in response to a pressure change.

The rolling diaphragm may be made out of any material that is impervious and compatible with fluids that may be distributed with the device. For example, if chlorine or sulfur dioxide gas is being distributed, a diaphragm of chemically resistant elastomer, such as VITON® polymer (E. I. du Pont, Wilmington, Del.) may be preferred. Alternatively, if ammonia gas is being distributed, a chlorosulfonated polyethylene elastomer, such as HYPALON® elastomeric material (E. I. du Pont, Wilmington, Del.) may be preferred.

The geometry of the valve body and the valve seat is preferably designed so that an amount of travel in the valve body results in an approximately equal percentage change in gas flow, regardless of the positioning of the valve body in relation to the valve seat. For example, a 10% deflection in the position of the rolling diaphragm, and therefore in the position of the valve body, preferably results in an approximately a 10% difference in the amount of fluid passing through the valve. More preferably, this ratio stays substantially constant regardless of whether the valve body is positioned to the left, to the right, or in the center of the position of travel. It is preferred that the valve body surface (and valve seat) be hemispherical, as such a configuration results in a more linear response between amount of travel and change in the rate of flow. More preferable, however, is a conically shaped valve body surface, as such a geometry provides flow characteristics comparable to those obtained with a hemispherical shape, yet may be more easily manufactured.

These devices may be used in any system that is feeding a low pressure point from one or more sources of fluid. Preferably, the device is used to feed a subatmospheric gas to a low pressure source such as a vacuum injector. Most preferably, each device is down-stream of a vacuum regulator so that all of the componentry and plumbing down-stream of the pressurized gas source is below atmospheric pressure, reducing the probability of gas leaking from the system into the ambient environment.

Figure 4:
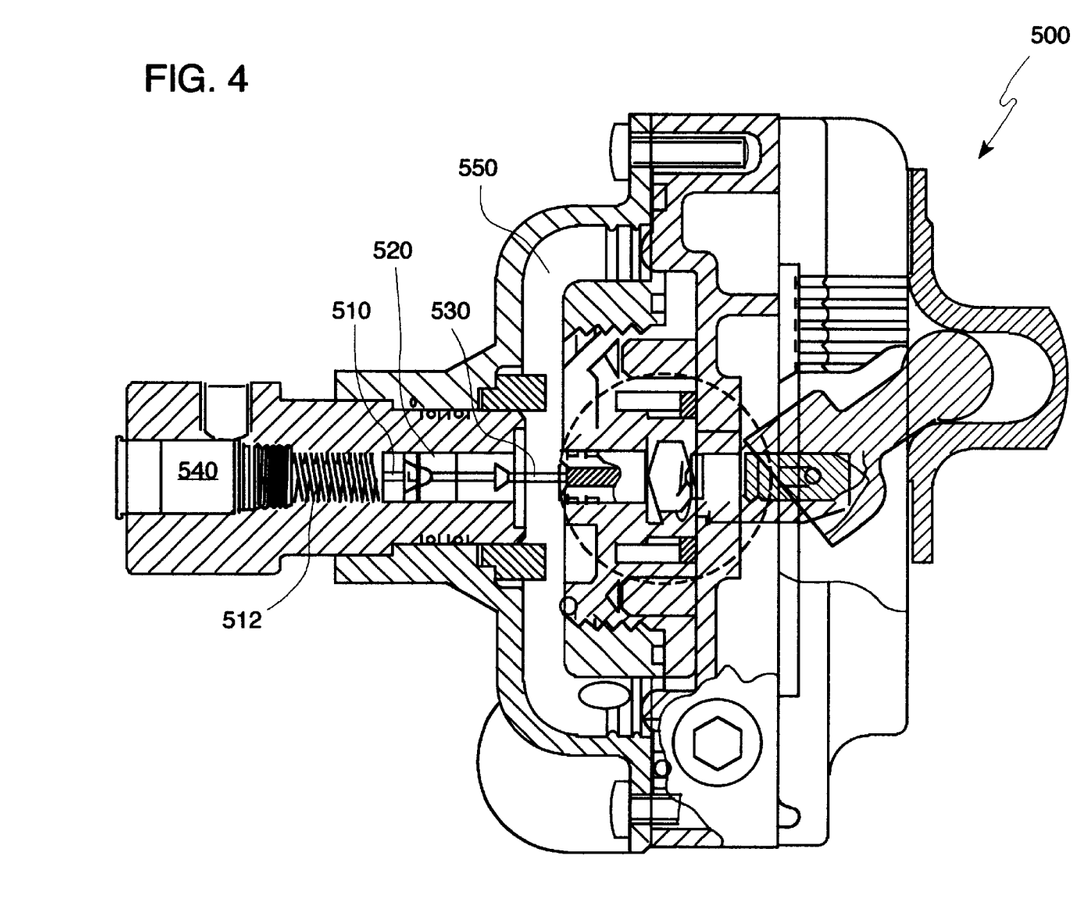
FIG. 4 is a schematic cross-sectional illustration of a vacuum regulating device.

FIG. 4 provides a cross-sectional illustration of a known multi-position vacuum regulator that may be used to feed a compressed gas such as chlorine or sulfur dioxide from a pressurized source to a vacuum system. A vacuum source is connected to outlet 540 and may apply a vacuum force to valve body 510 which may form a seal against valve seat 520. As the vacuum force is increased, any resistant force that may be applied by valve pin 530 is overcome and valve body 510 may be drawn to the left, opening the valve and providing for flow of fluid from cavity 550 past valve seat 520 and through outlet 540. The vacuum force may also be counteracted by an opposing force, provided by, for example, a valve spring 512. Thus, once this vacuum regulator is attached to a source of fluid, the flow of the fluid to the regulator may be determined, in part, by the vacuum force that is apparent at outlet 540. Therefore, if the amount of vacuum present at outlet 540 increases, the flow of fluid through the vacuum regulator should also increase.

Figure 5:
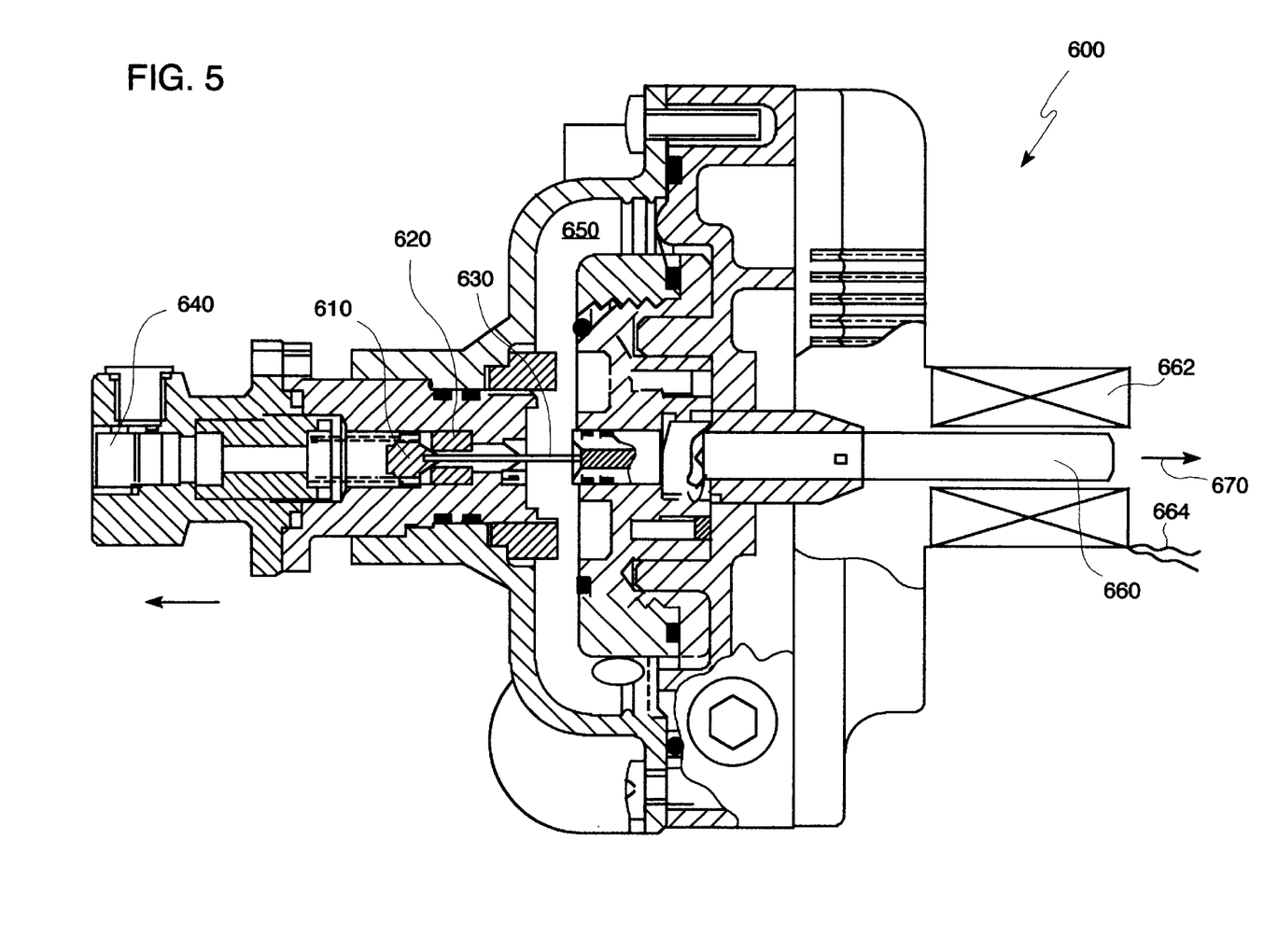
FIG. 5 is a schematic cross-sectional illustration of an electromagnetic biased vacuum regulator, which is part of an electromechanical equal drawdown system.

FIG. 5 provides an illustration of an aspect of the invention in which the flow of fluid through a vacuum regulator may be actively controlled by a counterforce that in turn may be regulated in response to the rate of flow, or a change in the rate of flow, from one or more fluid sources. For example, while a vacuum force applied at outlet 640 may provide a force to move valve body 610 from right to left, thus opening the valve and increasing the flow of fluid through the regulator, an opposite force applied in the direction of force 670, will pull valve body 610 closer to valve seat 620, thus reducing the flow of fluid. Such an opposing force may be applied, for example, by a spring, a piston, or a magnet. As shown in FIG. 5, the opposing force is adjustable and may be supplied by an electromagnet, or solenoid coil 662. As the current supplied through leads 664 is increased, the force applied to pin 660 in the direction of force 670, as shown in FIG. 5, is increased. Thus, as the current to the solenoid increases, the valve will be closed to a greater degree, as this electromagnetic force opposes the opening force applied by vacuum source 640.

Although force 670 may be applied in more than one direction so that it can serve to either open or close the valve, it is preferred that the force only be applied in a direction opposite to that supplied by vacuum source 640. In this case, any failure of the system would result in the regulator reverting to operation as a standard vacuum regulator and should not result in any excessive flow of gas through the device. Thus, it is preferable that the device be configured so that the counterforce can only throttle the fluid flow, not increase it. Pin 660 is preferably composed of magnetically responsive material, more preferably is steel, and most preferably is plated steel, to avoid corrosion. The magnetically responsive material may be internal or external to the regulator and may depend on the size of the pin or the size of the coil that is required to provide a necessary counterforce. An example of an appropriate solenoid system is the Series 8225, available from Automatic Switch Co., Florham Park, N.J.

The amount of force applied at point 670 may be controlled by a number of controllers or feedback mechanisms. For example, a solenoid coil may be controlled in response to a flow meter, or flow meters, measuring the fluid flow from a single fluid source, or from several fluid sources. For instance, a flow meter, such as a rotameter, may be placed in line in each of a set of gas cylinders, for example, between the vacuum regulator on each cylinder and a vacuum manifold. Once an increase in flow from a particular source is detected, a signal may be processed and the current may be increased to the solenoid coil controlling the vacuum regulator for that gas source. The increased current may increase force 670, causing the valve to throttle and to reduce the flow of fluid through the vacuum regulator. The system may be configured so that a sensed decrease in flow rate may have the opposite effect. Alternatively, the same sensed increase in the rate of flow may be responded to by decreasing the current to the solenoids on sister vacuum regulators (those for which there has not been a perceived increase in flow), the resulting decrease in current reducing the resultant force 670 for each of these regulators. Thus, the increase in flow from one source may be equalized through an increase in the flow from each of these adjusted sister fluid sources.

Preferably, the rate of drawdown from each fluid source, for example, a gas cylinder, may be measured by detecting a change in the rate of mass decrease for each of the gas cylinders feeding a system. For example, each gas cylinder may be positioned on an electronic balance and the weight of each cylinder may be fed to a processor, such as a computer. The computer may monitor the rate of decrease in the weight of the cylinder which may provide a direct reading of the amount of gas being drawn from the cylinder. The weight may be constantly reported, or may be read at specific intervals. If the mass of one of the cylinders starts to decrease at a rate greater than desired, for example, a pre-determined rate or the measured rate of decrease for its sister cylinders, the system may react to prevent frosting and to avoid other problems that may develop as a result of excessive drawdown. Once an increased rate of drawdown is perceived, a signal may be sent to the appropriate solenoid coil or coils, increasing the current to the coil and thus increasing force 670. This should result in a throttling of the valve, bringing the regulator flow back in line with the flow through its sister regulators.

Figure 6:
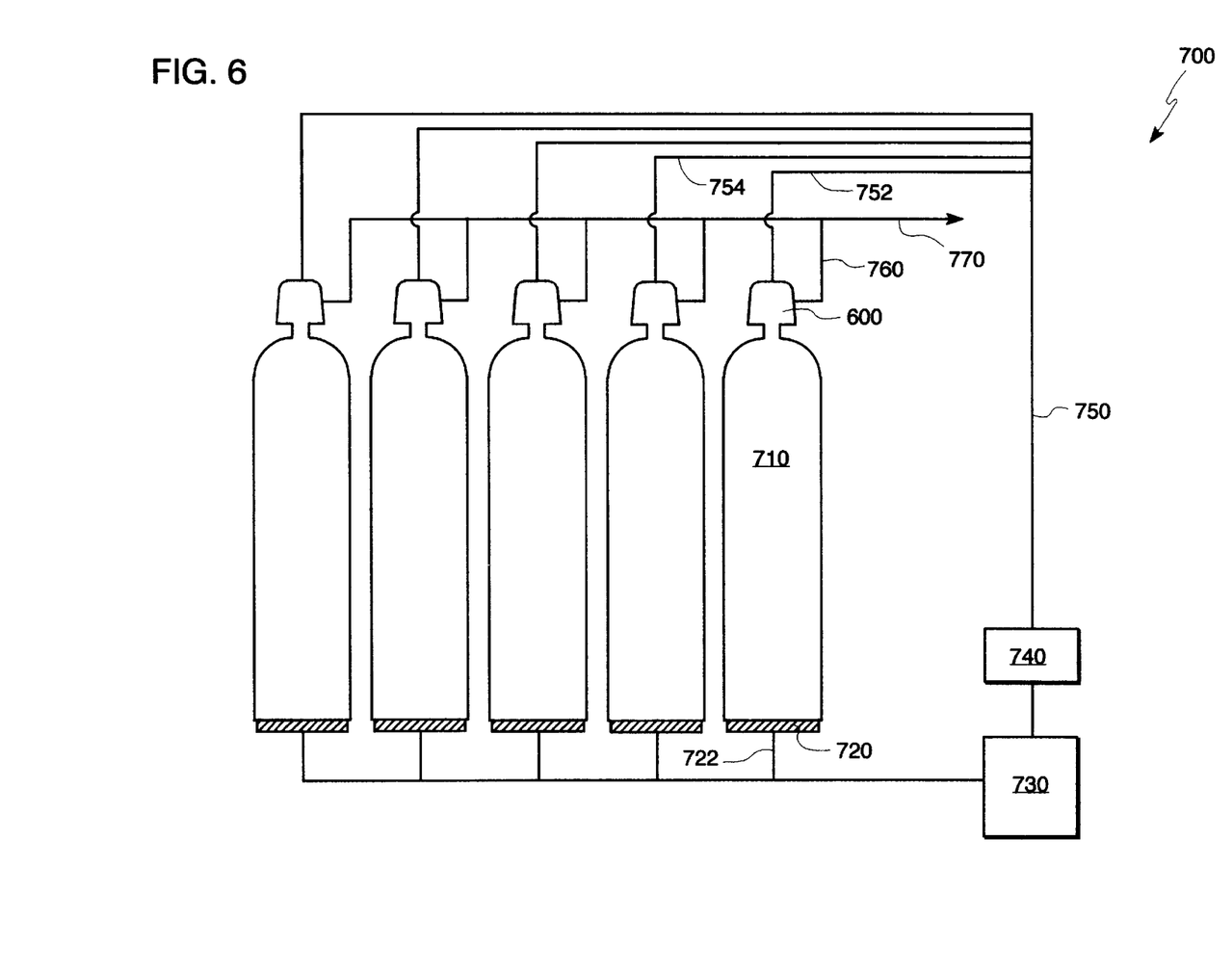
FIG. 6 is a schematic illustration of a electromechanical equal drawdown system, each including an electromagnetic biased vacuum regulator device as shown in FIG. 5.

An illustration showing a system embodiment of the invention is provided in FIG. 6. A bank of five identical chlorine gas cylinders is each attached in parallel to a vacuum manifold 770 that leads to a vacuum injector. Each of the gas cylinders may be monitored by an electronic balance such as balance 720 which measures and reports the weight of cylinder 710. A signal from balance 720 is sent to processor 730 via electronic connection 722 and processor 730 calculates a rate of flow from cylinder 710 as well as from its four sister cylinders. Alternatively, any other device capable of detecting the rate of drawdown may be used. For instance, flow meters, preferably mass flow meters, may be placed in line for one or more of the cylinders, for example, in line 760, in order to directly measure the fluid flow from the gas cylinder. In this case, such a flow detector may be connected to processor 730 to monitor the rate of flow in a method similar to that employing weight monitoring. Once processor 730 has measured and evaluated the flow from each of the five cylinders, a signal may be sent to controller 740 to increase or decrease the current being provided to any one or more of the five regulators, e.g., regulator 600. The processor may be programmed to react instantaneously to any changes, or preferably is programmed to react when flow variation from one or more fluid sources exceeds a particular threshold for a particular length of time.

Thus, if an upset in the system causes an increase in the flow from cylinder 710, processor 730 may direct controller 740 to adjust regulator 600 by sending a signal through lines 750 and 752, increasing current to solenoid 662 (FIG. 5). This may result in a throttling of flow from cylinder 710 and an equalization in flow among each of the five cylinders. Alternatively, the flow to each of the other four cylinders may be increased. Multiple banks of cylinders may be placed in series or in parallel and may be controlled either independently or by a common processor.

Figure 7:
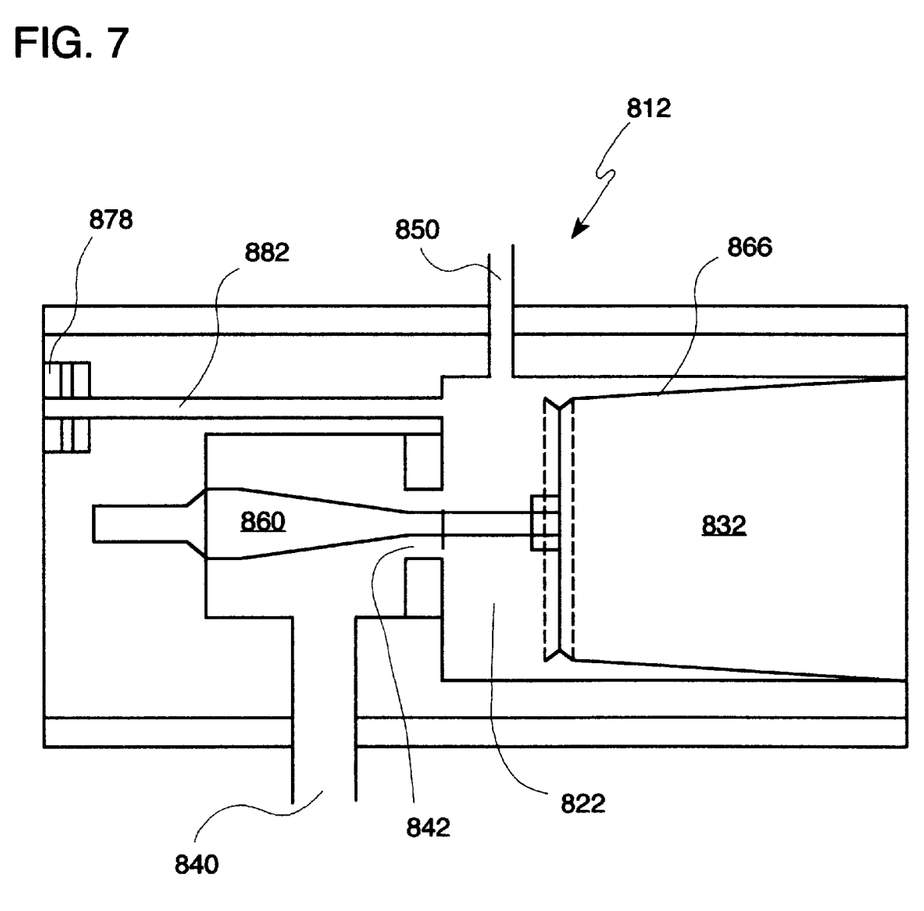
FIG. 7 is a schematic cross-sectional illustration of an equal drawdown device.
Figure 8:
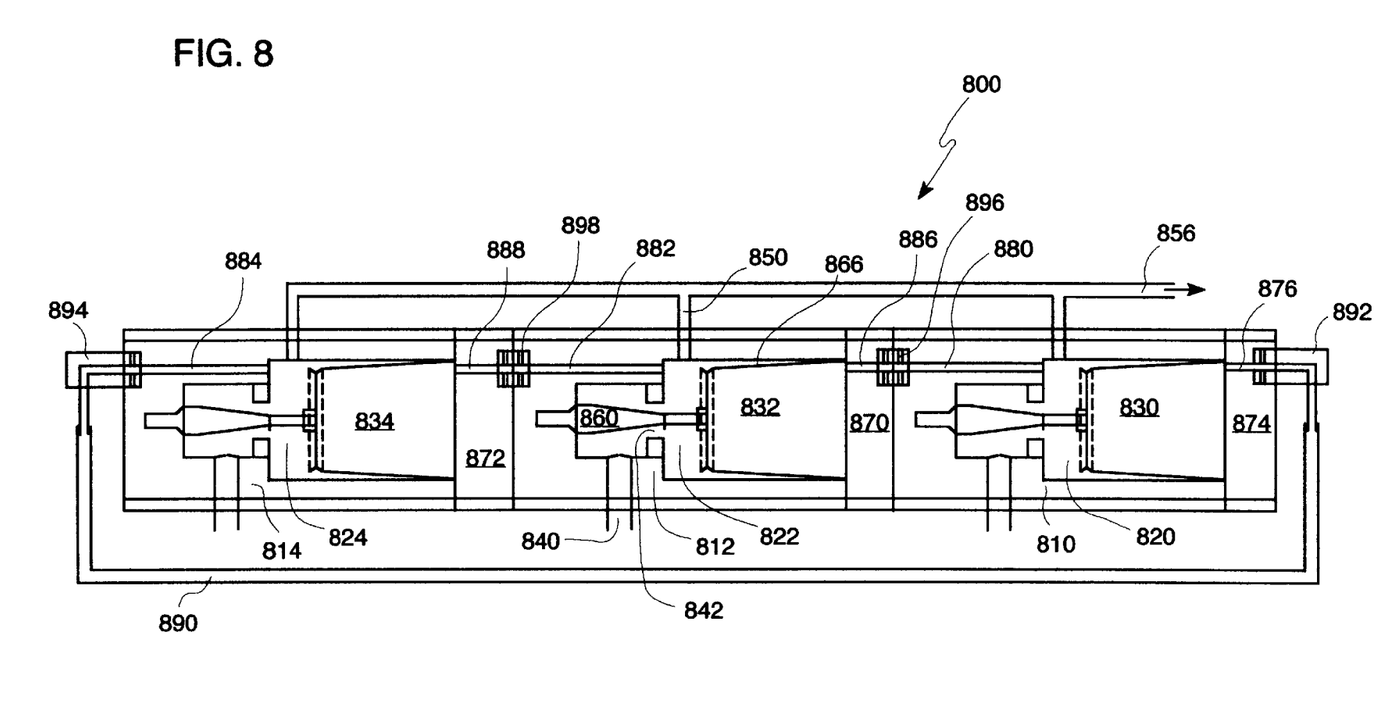
FIG. 8 is a schematic cross-sectional illustration of a modular system using three of the devices illustrated in FIG. 7.

FIGS. 7 and 8 provide illustrations of an embodiment where two or more fluid distribution devices may be stacked together to form a modular system. A single device that can be used with the system is shown in FIG. 7 The components of each device may be made from the same materials as the devices described above. System 800 may be composed of any number of individual devices such as 810, 812 and 814. In the embodiment shown, each of these devices is identical. The total number of devices used may be either an odd or an even number. The system operates similarly to that shown in FIG. 3, however, connection and disconnection of the separate devices is facilitated by a common modular design.

Each of the individual devices includes a flow chamber such as 820, 822 or 824 and an equalization chamber such as 830, 832 or 834. Using the centrally located device, 812, as an example, fluid may be fed from a fluid source such as vacuum regulator, to inlet 840. The vacuum regulator, may draw fluid from a source such as a cylinder of chlorine, ammonia or sulfur dioxide. Fluid, such as chlorine gas, flows through inlet 840 and into flow chamber 822 after passing through annular orifice 842 which is formed when valve body 860 is moved from right to left. Rolling diaphragm 866 isolates equalization chamber 832 from flow chamber 822 and rolls left or right in response to a variation in pressure between the two chambers. Thus, if the pressure in chamber 832 exceeds that in chamber 822, the valve body 860 will be moved from right to left, thus increasing the size of orifice 842 which will result in an increase in flow. If the pressure in chamber 832 is less than the pressure in chamber 822, the rolling diaphragm will move from left to right, thus moving valve body 860 from left to right and decreasing the size of orifice 842 with a resulting decrease in flow through the orifice. Vacuum is provided by vacuum injection or induction system 856 which is in fluid communication with outlet 850 that receives fluid flow from flow chamber 822. Vacuum source 856 is also in fluid communication with the flow chambers of each of the associated individual devices. Between device 812 and its two adjoining devices are a pair of connectors 870 and 872 that may be identical. Connectors 870 and 872 provide conduits, 886 and 888 respectively, that serve to provide a fluid connection between flow chamber 822 and equalization chamber 834 as well as between equalization chamber 832 and flow chamber 820. Pressure in flow chamber 822 is equalized with that of equalization chamber 834 by a fluid connection provided by conduit 882, connector 898 and conduit 888 which is in fluid communication with equalization chamber 834. Likewise, flow chamber 820 of device 810 communicates with conduit 880 which in turn communicates with connector 896 and conduit 886 that is in communication with equalization chamber 832. Thus, multiple units may be joined together by placing a middle connector, such as 870, between the two modular units along with union 896. Middle connector 870 is designed to mate with receiver 878 (FIG. 7) that provides for a fluid-tight connection between adjacent devices. A middle connector is configured to join two similar or identical devices in series. An end connector, however, is designed to terminate either end of the series and to provide fluid communication between an equalization chamber on one end of the series and a flow chamber on the opposite end.

Either or both ends of the modular system may be terminated by the use of an end connector such as 874. End connector 874 may include conduit 876 that communicates with tube 890 via threaded connector 892. Thus, while pressure-fit union 896 may join a connector and device using an unthreaded O-ring seal, end connector 874 may be designed to threadably receive connector 892. Likewise, connector 894 may be connected to conduit 884 in device 814 by a pressure fit design. Tubing 890 provides communication between flow chamber 824 and equalization chamber 830 via connector 894, tubing 890, connector 892, and conduit 876. Tubing 890 may be flexible polymeric material, such as PTFE, that is resistant to the fluid being used and may be of variable length to accommodate modular systems of different sizes without requiring change out of the tubing. Each of the connectors and/or devices includes clamps for securing the modules and connectors together and may also include integral hangers for wall mounting of the system. Thus, using the modular system illustrated in FIG. 8, the number of fluid sources may be increased or decreased within minutes, by simply adding or subtracting a modular unit, connector and union. When properly configured, the interdevice communication of the modular system will provide for equal drawdown from each of the fluid sources independently connected to each device.

Further modifications and equivalents of the invention herein disclosed will occur to persons skilled in the art using no more than routine experimentation, and all such modifications and equivalents are believed to be within the spirit and scope of the invention as defined by the following claims.

What is claimed:

1. A system comprising a plurality of fluid distribution devices comprising:
   a flow chamber comprising an inlet, a first outlet and a second outlet;
   an equalization chamber;
   a diaphragm separating the flow chamber and the equalization chamber;
   a valve positioned in a flow path between the flow chamber inlet and the first flow chamber outlet; and
   a pressure equalization conduit in communication with the second flow chamber outlet and in communication with a second equalization chamber; wherein the first outlet of each device is in communication with a common vacuum source.

2. The system of claim 1 wherein the diaphragm is a rolling diaphragm.

3. The system of claim 1 wherein a first and a second fluid distribution device are joined by a connector.

4. The system of claim 1 wherein the inlet of each of at least two fluid distribution devices is in communication with a different fluid source.

5. The system of claim 4 wherein each of the different fluid sources is a sub-atmospheric fluid.

6. The system of claim 5 wherein the sub-atmospheric fluid is selected from chlorine, sulfur dioxide and ammonia.

7. A system comprising an odd number of fluid distribution devices, each device comprising:
   a flow chamber comprising an inlet, a first outlet and a second outlet;
   an equalization chamber;
   a diaphragm separating the flow chamber and the equalization chamber;
   a valve positioned in a flow path between the flow chamber inlet and the first flow chamber outlet; and
   a pressure equalization conduit in communication with the second flow chamber outlet and in communication with an equalization chamber of a second device.

8. The system of claim 7 wherein a first and a second fluid distribution device are joined by a connector.

9. A system comprising a plurality of fluid distribution devices comprising:
   a flow chamber comprising an inlet, a first outlet and a second outlet;
   an equalization chamber;
   a diaphragm separating the flow chamber and the equalization chamber;
   a valve positioned in a flow path between the flow chamber inlet and the first flow chamber outlet; and
   a pressure equalization conduit in communication with the second flow chamber outlet and in communication with a second equalization chamber, wherein the inlet of each of the devices is in communication with a different fluid source.

10. The system of claim 9 wherein the fluid source is a sub-atmospheric fluid.

11. The system of claim 10 wherein the sub-atmospheric fluid is selected from the group consisting of chlorine, sulfur dioxide and ammonia.

12. The system of claim 9 wherein a first and a second fluid distribution device are joined by a connector.

13. A system comprising at least two fluid distribution devices, each device comprising:
   a flow chamber having an inlet and an outlet;
   an equalization chamber in fluid communication with the flow chamber of at least one other device;
   a valve including a valve body paired with a single valve orifice, the valve positioned in a flow path between the inlet and the outlet and configured to operate independently of the valve of the at least one device; and
   wherein the outlet of each of the devices is in communication with a common vacuum source.

14. The system of claim 13 wherein the first and second devices are joined by a connector.

15. The system of claim 13 wherein the fluid source is a sub-atmospheric fluid.

16. The system of claim 15 wherein the sub-atmospheric fluid is selected from the group consisting of chlorine, sulfur dioxide and ammonia.

17. The system of claim 13 wherein each device further comprises a diaphragm separating the flow chamber and the equalization chamber.

18. The system of claim 17 wherein the diaphragm is a rolling diaphragm.

19. A system comprising at least two fluid distribution devices, each device comprising:
   a flow chamber having an inlet and an outlet;
   an equalization chamber in fluid communication with the flow chamber of at least one other device;
   a valve including a valve body paired with a single valve orifice, the valve positioned in a flow path between the inlet and the outlet and configured to operate independently of the valve of the at least one other device; and
   wherein the system comprises an odd number of devices.

* * * * *